United States Patent Office 3,324,199
Patented June 6, 1967

3,324,199
LINEAR POLYMERIC KETONES CONTAINING A MULTIPLICITY OF HYDROXY ARYLENE GROUPS
Stanley Tocker, Wilmington, Del., assignor to E. I. du Pont de Nemours and Company, Wilmington, Del., a corporation of Delaware
No Drawing. Filed June 26, 1964, Ser. No. 378,428
7 Claims. (Cl. 260—857)

This invention relates to organic polymeric structures, and to shaped articles which contain the polymers and which are suitable for outdoor use. More particularly, this invention is directed to novel polymers containing a multiplicity of hydroxyaroylene units and to the use of such polymers as ultraviolet radiation absorbers.

Many structures based on a wide variety of organic polymers deteriorate rapidly when subjected to sunlight, since they are sensitive to light in the ultraviolet range, particularly in the wave length range of 2900 to 3800 Angstroms. Exposure to ultraviolet light tends to embrittle the structures and to reduce the level of their electrical and physical properties substantially. Additionally, some polymers acquire an undesirable color on exposure to ultraviolet light.

The use of certain chemical compounds as ultraviolet light absorbers in mechanical mixtures with polymers is known. Thus, compounds such as benzophenones or salicyclic esters have been incorporated in the molten polymer prior to forming an article, or they have been coated onto the surface of the article. In either case, the protection afforded by these compounds is not permanent. The compounds gradually disappear from the article due to their volatility.

It is therefore an object of this invention to prepare a non-volatile ultraviolet absorber of outstanding retention characteristics and which can be employed as an additive to known polymers useful in fabricating shaped objects, such as films, suitable for prolonged outdoor use. It is a further object to prepare such a material having a high efficiency as an ultraviolet absorber. A still further object is to prepare a new class of polymeric ultraviolet absorbers compatible with a variety of known useful polymers. Another object is to provide a process for preparing such polymeric ultraviolet absorbers. Still another object is to provide weather-resistant organic polymeric shaped articles which are resistant to degradation by ultraviolet light over a wide range of wave lengths. Other objects will become apparent hereinafter.

The present invention involves polymers and copolymers having a multiplicity of

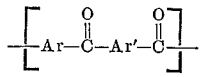

units wherein Ar is an arylene radical selected from the group consisting of

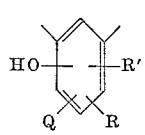 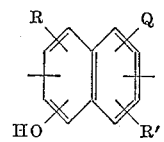

and

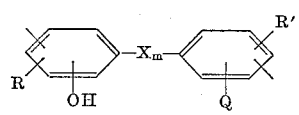

and Ar' is an arylene radical selected from the group consisting of Ar,

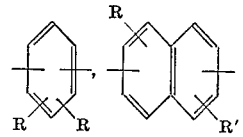

and

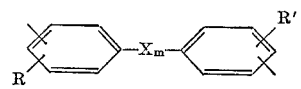

wherein Q is selected from the group consisting of H and OH; R and R' are each selected from the group consisting of H, Cl, Br, alkyl of 1 through 4 carbons, and alkoxy of 1 through 4 carbons; X is selected from the group consisting of O, S, and CR"R''' wherein R" and R''' are each selected from the group consisting of H, $CH_3$, and $C_2H_5$; and $m$ has the value zero or one; wherein (a) each hydroxyl group is so disposed as to be in conjugated relation, and is preferably ortho, to at least one carbonyl group, (b) two hydroxyl groups when located in the same benzenoid ring are disposed meta to one another, (c) two carbonyl groups when located in the same benzenoid ring are so disposed as to be other than ortho, i.e., meta or para, to one another, and (d) each bond shown in an indefinite position on a bicyclic structure can be located on either benzenoid ring of that bicyclic structure; said polymer or copolymer having a molecular weight of at least about 500.

The polymers of this invention are prepared by subjecting to the action of a Friedel-Crafts catalyst an aromatic polyester selected from the class consisting of (a) the self-condensed polyesters and mixed self-condensed polyesters

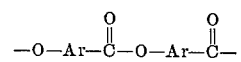

and (b) the co-condensed polyesters and mixed co-condensed polyesters

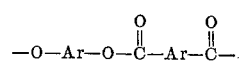

wherein Ar is an arylene group derived from a member of the class consisting of

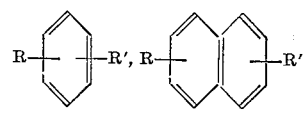

and

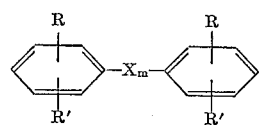

wherein R and R' are each selected from the class consisting of H, Cl, Br, alkyl of 1 through 4 carbons, and alkoxy of 1 through 4 carbons; X is selected from the group consisting of O, S, and CR"R''' wherein R" and R''' are each selected from the group consisting of H, $CH_3$, and $C_2H_5$; and $m$ has the value of zero or one.

By "arylene" is meant an aromatic diradical derived from an aromatic compound by removing two hydrogen atoms from different aromatic carbon atoms. Representative examples are phenylene and naphthylene. The free valence bonds can be on the same or different rings.

By "aroylene" is meant a diradical having a carbonyl group attached to one of the free valence bonds of an arylene group. Representative examples are benzoylene and naphthoylene.

By "aromatic self-condensed polyester" is meant a polyester derived from a phenolic carboxylic acid by self-condensation. By "mixed self-condensed polyester" is meant a self-condensed polyester derived from two or more phenolic carboxylic acids.

By "aromatic co-condensed polyester" is meant a polyester derived from a diphenol and an aromatic dicarboxylic acid by self-condensation. By "mixed self-condensed polyester" is meant a co-condensed polyester derived from two or more diphenols and/or two or more aromatic dicarboxylic acids.

A preferred group of polymers includes those having a multiplicity of hydroxyaroylene units wherein the carbonyl group is disposed ortho to at least one hydroxy group.

An especially preferred group of polymers include those having a multiplicity of hydroxybenzoylene units wherein the carbonyl group is disposed ortho to at least one hydroxy group. The especially preferred polymeric units include, for example,

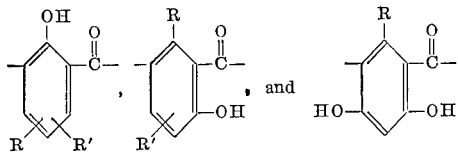

wherein R and R' are selected from the group consisting of hydrogen, chlorine, bromine, alkyl of 1 through 4 carbons and alkoxy of 1 through 4 carbons.

Other preferred polymeric units include, for example,

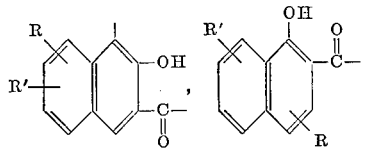

and

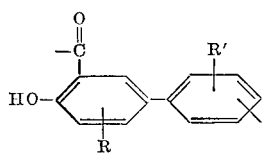

wherein R and R' are as defined above.

Additional polymeric units which come within the scope of the invention include, for example,

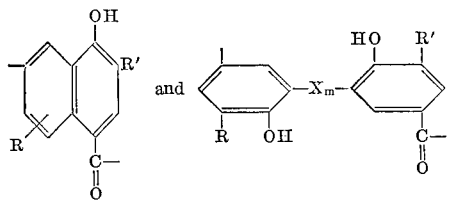

wherein R and R' are as defined above, and X is selected from the class consisting of O, S, and CR"R'" wherein R" and R'" are selected from the group consisting of H, CH$_3$, and C$_2$H$_5$; and $m$ is zero or one.

The specific structures shown hereinabove are only illustrative of the structural polymeric units falling within the scope of the invention. Other structural configurations isomeric with those shown are also contemplated as being within the invention as long as a carbonyl group attached to a given arylene unit is so located as to be in conjugated relationship with at least one hydroxy group of that arylene unit.

The novel polymers of this invention are substantially linear polymers containing a multiplicity of hydroxyarylene groups joined by carbonyl groups, wherein the carbonyl group is disposed in conjugated relationship to at least one hydroxy group and is preferably disposed ortho to at least one hydroxy group, and wherein the hydroxyarylene group is a mono or dihydroxy substituted arylene group derived from benzene, naphthalene, or

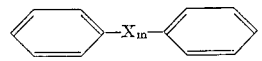

where X can be O, S, or CR"R'" wherein R" and R'" can be H, CH$_3$, or C$_2$H$_5$, and $m$ is zero or one, and substituted derivatives thereof where one or more substituents are selected from the group consisting of chlorine, bromine, alkyl of 1 through 4 carbons and alkoxy of 1 through 4 carbons.

The polymers of this invention are prepared by subjecting to the action of a Friedel-Crafts catalyst polyesters based on phenolic carboxylic acids containing at most two aromatic rings, or alternatively based on diphenols and aromatic dicarboxylic acids containing at most two aromatic rings. Polymers which can be used in the process of this invention include, for example, polyesters derived from salicylic acid, p-(4-hydroxyphenyl)-benzoic acid, 3-hydroxy-2-naphthoic acid, 5-hydroxy-1-naphthoic acid, 5-chlorosalicylic acid, 5-bromosalicylic acid, 2-methoxy-4-(4'-hydroxyphenyl)benzoic acid, 4-ethoxysalicylic acid, 6-methyl-4-hydroxy-1-naphthoic acid, 1-methoxy-6-hydroxy-2-naphthoic acid, 5-hydroxy-diphenyl-2-carboxylic acid, and p-()-hydroxyphenoxy)benzoic acid. It will be understood that other position isomers of the illustrative compounds are also operative in this invention, that other similar compounds can also be successfully used, and that copolyesters prepared from mixtures of two or more such compounds can also be used. Alternatively the polymers employed in the process of this invention can be polyesters based on diphenols and aromatic dicarboxylic acids. The diphenols include, for example, resorcinol, diphenols based on diphenyl such as 4,4'-dihydroxydiphenyl and 3,3'-dihydroxy-5,5'-dimethoxydiphenyl, diphenols based on naphthalene such as 1,5-dihydroxynaphthalene and 2,6-dihydroxy - 4 - methyl - naphthalene, bis(3 - hydroxyphenyl) ether and bis(4-hydroxyphenyl) sulfide. The aromatic dicarboxylic acids include, for example, terephthalic acid, isophthalic acid, 2-methoxyterephthalic acid, diphenic acid, 4,4'dichlorodiphenic acid, napthalene-1,5-dicarboxylic acid, 4-methylnapthalene-1,8-dicarboxylic acid, bis(4-carboxyphenyl) ether, bis(4-carboxyphenyl) sulfide and diphenylmethane - 4,4' - dicarboxylic acid.

The arrangement of the polyesters to the polyketones of this invention is carried out in the presence of a Friedel-Crafts catalyst. The rearrangements are carried out in appropriate anhydrous media, preferably nitrobenzene or carbon disulfide, although in some reactions of this type other organic media have been employed. The rearrangements are effected by heating the polyester dispersed in the anhydrous medium at a temperature between about 30° C. and 175° C. in the presence of a Friedel-Crafts catalyst such as aluminum chloride, zinc chloride, ferric chloride, antimony pentachloride, stannic chloride, aluminum bromide or boron trifluoride for about 1 to 60 minutes. Alternatively, irradiation with strong actinic light such as that from a mercury vapor lamp can be used.

The polyesters employed as intermediate to the polyketones of this invention are most conveniently prepared from the acid halide derivatives of the acids with elimination of the elements of hydrogen halide, either as such, or in the presence of a basic acceptor for the hydrogen halide, such as sodium hydroxide or pyridine, as described by W. R. Sorenson and T. W. Campbell ("Preparative Methods of Polymer Chemistry," Interscience Publishers, 1961, New York, N.Y.). The polyesterification thus proceeds by way of a phenolic carboxylic acid halide or alternatively by reaction of an aromatic diacid chloride with a diphenl. In some cases the polyester can advantageously be made by reaction of the diacid with diphenol or by self condensation of a phenolic carboxylic acid in the presence of an agent such as phosphorus pentoxide or phosphorus oxychloride. It will be understood that polyesters prepared by any method whatever, so long as they are constituted as described hereinbefore, can be employed in the invention.

The polyketones of this invention are highly efficient absorbers of ultraviolet radiation. Many absorb ultraviolet radiation over a broad range of wavelengths. By blending two or more polymers, each of which is made up of a single type of polymer unit, or by use of copolymers made up of different polymer units, one can prepare ultraviolet screening agents which very effectively absorb radiation over substantial portions of the ultraviolet spectrum, or even, for all practical purposes, the entire ultraviolet emission spectrum of sunlight.

Polyketones of this invention having a wide range of molecular weights are useful. In order to have broad utility, it is desired that the polyketone be of sufficiently high molecular weight to be essentially non-volatile. Low polymers having very low molecular weights will also possess chemical linkages like those of the higher polymers, and thus will be efficient absorbers of ultraviolet radiation and have some utility even though exhibiting a low degree of volatility. Although it is preferred that the polyketones have molecular weights in excess of 1000, they can have molecular weights as low as about 500 (that is, in some cases the polymers may contain as few as about 3 monomer units).

The polyketones of this invention are useful over a wide range of concentrations when blended with other polymers. Generally, between about 0.1% and 5% by weight of a polyketone will be employed to provide the desired stabilization to ultraviolet radiation. However, for some applications, or with some specific polymers, as little as 0.001% by weight of the polymeric stabilizer of this invention will be sufficient by virtue of its permanency as compared with known ultraviolet stabilizers. Also, in some specific instances, it is of advantage to employ as much as 10% or even 20% by weight of a polyketone of this invention in order to achieve an extreme degree of stabilization at little or no sacrifice of other properties, due to the polymeric nature of the additive.

Examples of polymers with which the polyketones of this invention can be employed include, for example, polyolefins such as polyethylene, polypropylene, and their copolymers with other mono and diolefins and functionally substituted olefins; polyvinyl chloride and polymers thereof; polyvinylidene chloride and copolymers thereof; polystyrene and substituted polystyrenes; polyacrylate esters and polymethacrylate esters; polyacrylonitrile and copolymers thereof; various fluorinated polymers and copolymers such as polyvinyl fluoride, polyvinylidene fluoride, polyetetrafluoroethylene and polychlorotrifluoroethylene; polyesters such as polyethylene terephthalate and polyesters containing unsaturated acids such as maleic acid and fumaric acid; and polyamides and polyimides.

When incorporated as ultraviolet light absorbers in the fabrication of polymeric articles the polyketones of this invention can be used either alone or in combination with other additives such as antioxidants. The antioxidant can be any of the known types, including hindered phenols such as 2,6-di-t-butylphenol, sulfur containing esters such as dilauryl thiodipropionate, and others known in the art.

The blends of the aforesaid polymers and the polyketones of this invention can be in the form of films, fibers, coatings, and other shaped articles.

In the examples which follow the infrared spectra were taken on pressed films following known techiques. Interpretation of the spectra for features of chemical structure was in accordance with practices known to those skilled in the art and described by W. M. D. Bryant and R. C. Voter (J. Am. Chem. Soc., 75, 6113 (1953)) and by F W. Billmeyer ("Textbook of Polymer Chemistry" Chapter 4, Interscience Publishers, 1957, New York, N.Y.).

Measurements of ultraviolet light absorption were carried out in accordance with procedures described by C. R. N. Strouts, J. H. Gilfillan and H. N. Wilson ("Analytical Chemistry," vol. II, Chapter 22, Oxford University Press, 1955, London).

The light stability test used in the examples was carried out by exposing films to the action of a bank of Westinghouse Sunlamps for the periods indicated.

The following examples will serve to illustrate specific embodiments of the invention and they are not intended to be limiting thereon. Parts and percentages are by weight unless otherwise indicated.

*Example 1*

A solution of 15.6 parts of salicyloyl chloride in 18 parts of anhydrous nitrobenzene was refluxed under nitrogen until evolution of hydrogen chloride ceased (about 2.5 hours). The resulting solution of polysalicylic ester was cooled to approximately 15° C., 17.3 parts of aluminum chloride was added rapidly with stirring, and the mixture was heated to 130° C. for 2 minutes and cooled in an ice bath. The mixture was treated with 300 parts of 5% aqueous hydrochloric acid, and the product was collected by filtration and washed with ether. The polymer was dissolved in acetone, the solution was diluted with water to precipitate the product, the polymer was collected by filtration, washed with copious amounts of hot water, and dried. The polymer melted at 110° C.

The ultraviolet spectrum of the polyketone showed absorption in chloroform at lambda (max.) 3350 Angstroms slightly less intense than that of an equivalent concentration of o-hydroxybenzophenone, and at higher and lower wave lengths in the near visible portion of sunlight (down to about 2900 Angstroms and up to about 4400 Angstroms) more intense than the same substance. This polymer contains the units

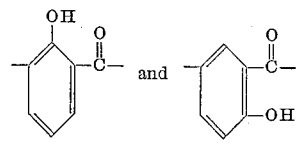

A film stabilized with 1% of the polyketone of this example was prepared from 19.8 parts of polyvinyl fluoride and 0.2 part of the polyketone in 230 parts of gamma-butyrolactone. The solution was cast on a glass plate preheated to 150° C. and the solvent was evaporated at 150° C. in an air oven. A second film containing 2% of the polyketone was prepared similarly. The two films were heated in a vacuum oven at 100° C. under reduced pressure of 0.1 millimeter of mercury for 3 hours with no reduction in the ultraviolet absorber content as shown by comparative infrared spectra. Known ultraviolet absorbers such as 2-hydroxybenzophenone are volatized under these conditions. The films showed no tendency to haze or exude the ultraviolet absorber when exposed to a bank of sunlamps for a period of 2 months at 60° C.

*Example 2*

To a refluxing solution of 4.0 parts of naphthalene-1,5-diol in 60 parts of nitrobenzene was added dropwise, with vigorous stirring under a nitrogen atmosphere, 5.1 parts of isophthaloyl chloride in 12 parts of nitrobenzene. After addition was complete, the resulting solution was refluxed under nitrogen for three hours, until evolution of hydrogen chloride ceased. The mixture was cooled to room temperature, and to the viscous solution of polyester 5.0 parts of anhydrous aluminum chloride was added with vigorous stirring. The mixture was heated to 130° C. for 2 minutes with vigorous stirring, and then cooled to 0° C. The mixture was treated with 300 parts of 5% aqueous hydrochloric acid with stirring. The nitrobenzene layer was separated from the aqueous phase, and the solid polymeric material it contained was collected by filtration and washed with ether.

The polyketone obtained showed two maxima in the ultraviolet portion of sunlight, at lambda (max.) 3350 Angstroms and at lambda (max.) 3900 Angstroms (measured in chloroform solution), confirming the presence of ortho-hydroxy aromatic ketone groups, as shown in the structure

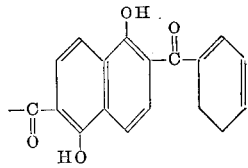

By comparison, the intermediate polyester exhibited no such maxima in these regions of the spectrum.

The products of this invention are resistant to degradation by ultraviolet light over a wide range of frequencies and for prolonged periods of time. As a wide variety of polymers can be stabilized by blending with the new polymeric ultraviolet absorbers and since the compositions can take a variety of forms, e.g., self-supporting films, coatings, elements of laminates, filaments, tubing, etc., the blended polymers are important for outdoor commercial applications. These compositions will find utility in the preparation of greenhouses, exterior screening, garden hose, as part of automobile exteriors, etc.

The polyketones of this invention constitute a new class of materials which possess many advantages over previously known ultraviolet absorbers. They are more or less permanent materials, not being lost from the article by volatization over extended periods. Since they are employed as additives and are not incorporated into the basic polymer structure of the article, the bulk properties of the basic polymer are substantially unchanged, and little or no adjustment need be made in its manufacture, handling, fabrication, etc. They have the additional advantage of being highly efficient absorbers of ultraviolet radiation, being essentially "pure" ultraviolet absorbers, that is, they have no extraneous parent polymer chain or molecular structure serving to carry the ultraviolet absorber, which extraneous molecular structure would contribute "dead weight."

The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. A substantially linear polymer having a multiplicity of

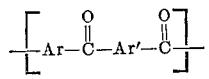

units wherein Ar is an arylene radical selected from the group consisting of

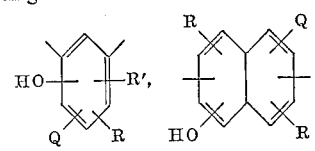

and

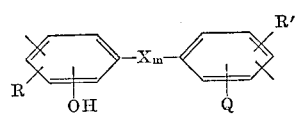

and Ar' is an arylene radical selected from the group consisting of Ar,

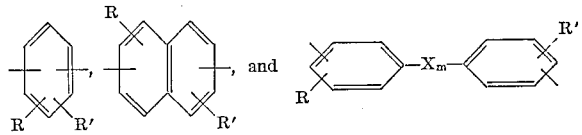

wherein Q is selected from the group consisting of H and OH; R and R' are each selected from the group consisting of H, Cl, Br, alkyl of 1 through 4 carbons, and alkoxy of 1 through 4 carbons; X is selected from the group consisting of O, S, and CR"R''' wherein R" and R''' are each selected from the group consisting of H, CH$_3$, and C$_2$H$_5$; and m is selected from the group consisting of zero and one; wherein (a) each hydroxyl group is in conjugated relation to at least one carbonyl group, (b) two hydroxyl groups when located in the same benzenoid ring are disposed meta to one another (c) two carbonyl groups when located in the same benzenoid ring are so disposed as to be other than ortho to one another, and (d) each bond shown in an indefinite position on a bicyclic structure can be located on either benzenoid ring of that bicyclic structure; said polymer having a molecular weight of at least about 500.

2. A polymer as set forth in claim 1 wherein said (a) each hydroxyl group is ortho to at least one carbonyl group.

3. A polymer as set forth in claim 2 wherein Ar is an ortho-hydroxylbenzene group.

4. A weather resistant shaped article comprising a polymer selected from the group consisting of polyethylene, polypropylene, polyvinyl chloride, polyvinylidene chloride, polystyrene, polyacrylic acid esters, polyacrylonitrile, polyvinyl fluoride, polyvinylidene fluoride, polytetrafluoroethylene, polychlorotrifluoroethylene, polyesters, polyamide and polyimides and blended therewith about 0.001% to 20% by weight of a substantially linear polymer having a multiplicity of

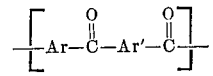

units wherein Ar is an arylene radical selected from the group consisting of

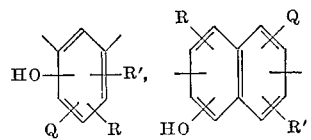

and

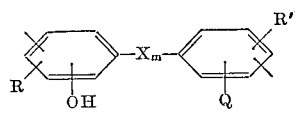

and Ar' is an arylene radical selected from the group consisting of Ar,

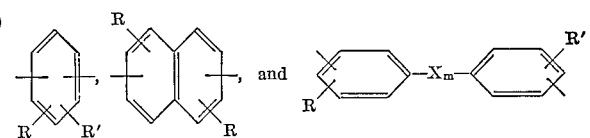

wherein Q is selected from the group consisting of H and OH; R and R' are each selected from the group consisting of H, Cl, Br, alkyl of 1 through 4 carbons, and alkoxy of 1 through 4 carbons; X is selected from the group consisting of O, S, and CR"R''' wherein R" and R''' are each selected from the group consisting of H, CH$_3$, and C$_2$H$_5$; and m is selected from the group consisting of zero and one; wherein (a) each hydroxyl group is in conjugated relation to at least one carbonyl group, (b) two hydroxyl groups when located in the same benzenoid ring are disposed meta to one another, (c) two carbonyl groups when located in the same benzenoid ring are so disposed as to be other than ortho to one another, and (d) each bond shown in an indefinite position on a bicyclic structure can be located on either benzenoid ring of that bicyclic structure; said polymer having a molecular weight of at least about 500.

5. A shaped article as set forth in claim 4 wherein said (a) each hydroxyl group is ortho to at least one carbonyl group.

6. A shaped article as set forth in claim 5 wherein Ar is an ortho-hydroxybenzene group.

7. The process comprising subjecting to the action of a Friedel-Crafts catalyst an aromatic polyester selected from the class consisting of (a) self-condensed polyesters and mixed self-condensed polyesters of the formula

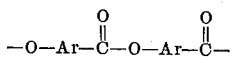

and (b) co-condensed polyesters and mixed co-condensed polyesters of the formula

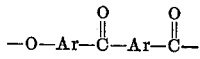

wherein Ar is an arylene group derived from a member of the class consisting of

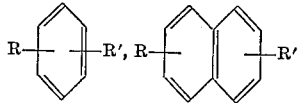

and

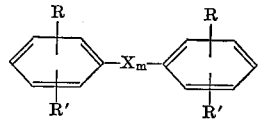

wherein R and R' are each selected from the class consisting of H, Cl, Br, alkyl of 1 through 4 carbons, and alkoxy of 1 through 4 carbons; X is selected from the group consisting of O, S, and CR"R'" wherein R" and R'" are each selected from the group consisting of H, $CH_3$ and $C_2H_5$; and $m$ is selected from the group consisting of zero and one.

References Cited

UNITED STATES PATENTS 3,065,205 11/1962 Bonner _____ 260—47
3,200,286 8/1965 Cleman _____ 260—47

FOREIGN PATENTS 1,282,434 11/1961 France.

MURRAY TILLMAN, *Primary Examiner.*

PAUL LIEBERMAN, *Assistant Examiner.*